United States Patent [19]

Braillon

[11] Patent Number: 4,542,890

[45] Date of Patent: Sep. 24, 1985

[54] MAGNETIC CHUCK

[75] Inventor: Philibert M. Braillon, Montmelian, France

[73] Assignee: Braillon & Cie, Montmelian, France

[21] Appl. No.: 566,329

[22] Filed: Dec. 28, 1983

[30] Foreign Application Priority Data

Dec. 28, 1982 [FR] France ............................... 82 22198

[51] Int. Cl.⁴ .............................................. B25B 11/00
[52] U.S. Cl. ......................................... 269/8; 335/295
[58] Field of Search ............................ 269/8; 335/295

[56] References Cited

U.S. PATENT DOCUMENTS

| | | | |
|---|---|---|---|
| 3,818,399 | 6/1974 | Edwards | 335/295 |
| 4,379,277 | 4/1983 | Braillon | 335/295 |
| 4,468,648 | 8/1984 | Uchikune | 335/295 |

Primary Examiner—Frederick R. Schmidt
Assistant Examiner—Steven P. Schad
Attorney, Agent, or Firm—Karl F. Ross; Herbert Dubno

[57] ABSTRACT

A magnetic chuck designed as a releasable holder for ferromagnetic workpieces comprises an orthogonal matrix of flat permeable pole pieces rising above a ferromagnetic base plate, the pole pieces forming rows parallel to their major faces and columns perpendicular thereto; the pole pieces of the two outermost rows contact the base while the other pole pieces are separated from the base by a nonpermeable layer. The rows of pole pieces alternate with rows of flat permanent magnets which follow one another with the same pitch as the pole pieces and are magnetized in the transverse direction with alternating polarity in each row. The magnets of every other row are fixedly aligned with the pole pieces of their columns while those of the remaining rows are longitudinally shiftable by one pitch to establish either a working position, with like magnet poles confronting each other across an intervening pole piece, or an inoperative position in which the magnet poles alternate within each column.

14 Claims, 9 Drawing Figures

MAGNETIC CHUCK

FIELD OF THE INVENTION

My present invention relates to a chuck of the type including an array of permanent magnets which are relatively displaceable between a working position and an inoperative position, being effective in the working position to retain one or more ferromagnetic workpieces on at least one surface while releasing these workpieces upon a shift into the other position.

BACKGROUND OF THE INVENTION

Devices of this description are described and claimed in my prior U.S. Pat. Nos. 3,775,517 and 4,379,277. The earlier one of these patents discloses a face plate consisting of alternating pole pieces and nonmagnetic spacers, that plate being supported by a frame in which a core is movable between the aforementioned positions. The core and the frame include bar magnets and additional pole pieces whose relative alignment or disalignment forms circuits for the magnetic flux which either are closed in the device itself or pass through workpieces to be attracted. My second patent shows a device of the same general type including a longitudinally shiftable stack of flat permanent magnets and intervening flat pole pieces which are selectively alignable with other, fixedly positioned pole pieces that are polarized by further, stationary permanent magnets. Another device of this character is the subject matter of my copending applications Ser. No. 478,078 filed Mar. 23, 1983, now U.S. Pat. No. 4,465,993, that device comprising a permanently magnetized rotor bracketed by stationary pole pieces.

Reference may additionally be made to my prior U.S. Pat. No. 4,075,589 disclosing a holder rendered operative by a set of electromagnets.

The frame forming part of the device of my first-mentioned patent leaves only the face plate exposed for the alternate retention and release of a workpiece. U.S. Pat. No. 4,379,277 shows a structure which also exposes lateral edges of the stationary pole pieces whereby sides of the chuck form ancillary workpiece-retaining surfaces.

OBJECTS OF THE INVENTION

The general object of my present invention is to provide a magnetic chuck or holder which is similar to but even more effective than that of U.S. Pat. No. 4,379,277 while having a rather simple structure.

Another object of my invention is to provide a chuck of this type which also has an end face capable of attracting or releasing one or more workpieces.

SUMMARY OF THE INVENTION

A magnetic chuck according to my present invention comprises a magnetically permeable base plate supporting an orthogonal matrix of flat magnetically permeable and substantially identical pole pieces which are arrayed in rows parallel to their major faces and in columns transverse thereto, the pole pieces of the two outermost rows of the matrix being in contact with the base plate while the pole pieces of all other, intermediate rows are separated therefrom by magnetically nonpermeable spacing means. Neighboring rows of pole pieces are separated from one another by channels that are bounded by coplanar faces of the pole pieces whose upper edges lie in a plane parallel to the base plate. A plurality of groups of flat permanent first magnets with transverse magnetization are fixedly disposed in every other channel with pole faces confronting the major faces of respective pole pieces of each adjoining row. The polarities of these first magnets alternate within each group but are the same within each column of the matrix. Similarly, a plurality of groups of flat permanent second magnets—likewise transversely magnetized and spaced apart with the same magnetic pitch as the first magnets—are disposed in the remaining channels in which they are movable between two positions. The polarities of the second magnets also alternate within each group and equal those of the first magnets aligned therewith in corresponding columns in one inoperative position while being opposite the polarities of the first magnets aligned therewith in corresponding columns in the other working position. All the second magnets are coupled to actuating means enabling their joint displacement into either of these two positions.

According to a more particular feature of my present invention, the movable second magnets occupy respective compartments of associated harnesses slidable in their channels, these harnesses being coupled to a drive member forming part of the aforementioned actuating means. The harnesses may have upstanding teeth defining the compartments and separating the associated magnets from one another; a similar set of stationary harnesses or racks may be used to hold the fixed magnets in place.

Pursuant to a further feature of my invention, the pole pieces other than those of the two outermost rows are mounted in a nonmagnetic and possibly nonmetallic grid which includes the spacing means separating them from the base plate. This grid advantageously comprises a bottom plate provided with several sets of upstanding stays interposed between the pole pieces of respective intermediate rows; the upper ends of the stays of each set are interconnected by a bar which has cutouts penetrated by the tops of the pole pieces of the respective row so as to be accessible from above as are the pole pieces of the outermost rows. The bottom plate of the grid may be subdivided into sections each bearing one of the sets of stays, these sections preferably adjoining one another in an imbricated relationship. Such imbrication can also be used for the bars of the grid to enhance the stability of the structure. The adjoining bars and bottom sections, with or without imbrications, may be adhesively interconnected.

The described grid may further include an end wall which rises from the bottom plate and adjoins a column of pole pieces while being rigid with the bars supported by the stays. If, however, this end wall is omitted or is substantially reduced in height, the pole pieces of the corresponding end column will be accessible along a transverse face of the matrix which thus becomes an ancillary workpiece-engaging surface. An opposite transverse face advantageously adjoins the location of a drive member used to displace the movable magnets.

BRIEF DESCRIPTION OF THE DRAWING

The above and other features of my present invention will now be described in detail with reference to the accompanying drawing in which.

SPECIFIC DESCRIPTION

Figure 1:
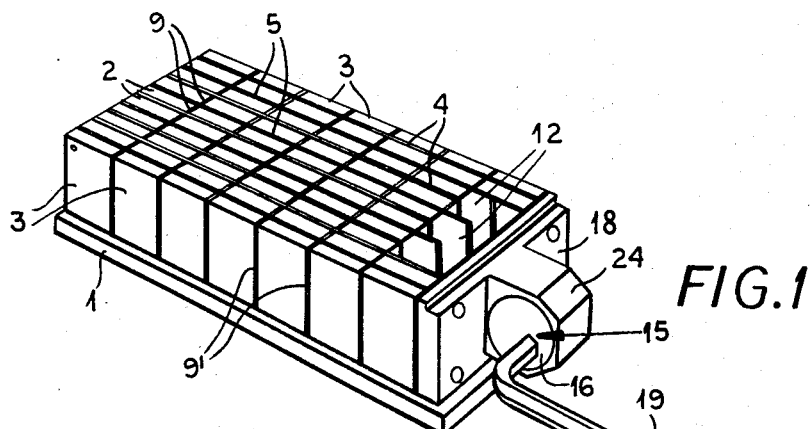
FIG. 1 is a perspective view of a magnetic chuck embodying my invention.

FIG. 1 shows a magnetic chuck according to my invention having a rectangular base plate 1 of a magnetically permeable material such as soft iron. This base plate is overlain by an orthogonal matrix of mutually identical pole pieces, also consisting of a metal of high magnetic permeability, with coplanar major faces arrayed in respective rows parallel to the major edges of base plate 1; the pole pieces 3 of the two outermost rows are permanently secured to plate 1, e.g. by soldering, whereas the intermediate pole pieces 2 are magnetically isolated from that plate by a nonpermeable spacing layer 7 seen in FIGS. 3, 4 and 6. The several pole pieces 3 of each outermost row are separated from one another by nonmagnetic stays 9, rising directly from base plate 1; the pole pieces 2 of the intermediate rows similarly alternate with interposed stays 9 integral with spacing layer 7 which forms the bottom of a nonmagnetic grid holding these pole pieces in position. The several rows of pole pieces 2, 3 are spaced apart by an odd number of intervening longitudinal channels, nine of them in the present instance.

A housing 18 adjoins the matrix 2, 3 along one of the minor sides of the rectangle to operate an actuating mechanism 15 including a drum 16 with a crank pin (not visible) which is rotatably lodged in an extension 24 of housing 18 and carries a handle 19 enabling its manual rotation. This mechanism serves for the longitudinal shifting, between an illustrated inoperative position and an alternate working position, of several movable racks or harnesses 12 which carry respective groups of permanent magnets 5 in every even-numbered channel. The odd-numbered channels contain similar permanent magnets 4 which are fixedly interleaved with the pole pieces of respective columns of the matrix. Magnets 4 and 5 have pole faces confronting the major faces of pole pieces 2 and 3 in an inoperative position, shown in FIGS. 1, 5 and 6, as well as in a working position, illustrated in FIGS. 2-4.

The device of FIG. 1, whose operation will become clear from the subsequent description of more elaborate embodiments, has an upper or main holding surface formed by the tops of more than 60 pole pieces 2 and 3, two ancillary lateral holding surfaces each formed by major faces of seven pole pieces 3, and an ancillary rear holding surface formed by narrow sides of ten pole pieces 2, 3. The attractive force available at the two lateral holding surfaces in the working position of the device is weaker than that on the upper and rear surfaces' for reasons that will become apparent.

The magnetic chuck shown in FIGS. 2-6 again has a magnetically permeable rectangular base plate 1 carrying a bottom layer 7 of a nonmagnetic grid 6 including stays 9 interleaved with pole pieces 2 of eight intermediate rows of an orthogonal matrix similar to that of FIG. 1. Layer 7 has 9 parallel ribs 7', of small height, bracketing the lower ends of pole pieces 2 along with the stays 9 separating same. The ribs 7' constitute the lower boundaries of the nine aforementioned channels accommodating the fixed magnets 4 and the movable magnets 5. The grid 6 further comprises nine horizontal bars 8 which form the upper boundaries of the channels and overlie the groups of magnets 4 and 5 while confining the tops of the pole pieces 2 between them. A further part of this grid is a rear end wall 25 connecting the bottom layer 7 with the bars 8 whose upper edges are flush with the tops of the pole pieces.

Figure 3:
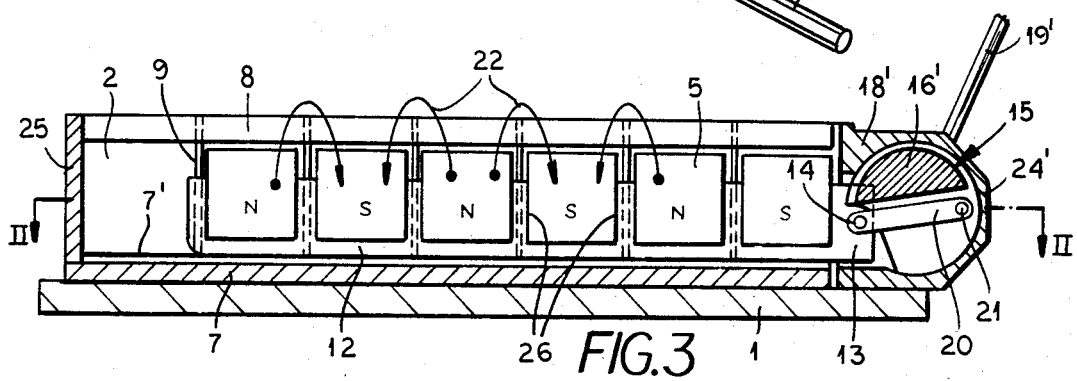
FIG. 3, is a longitudinal-sectional view taken on the line III—III of FIG. 2.

The harnesses 12, as best seen in FIG. 3, ride on respective ribs 7' and have upstanding teeth 26 whose spacing equals that of the stays 9, 9'. The teeth 26 form compartments receiving the magnets 5, holding them spaced apart in the longitudinal direction of the rows. The front ends of harnesses 12 have lugs 13 traverse by a common rod 14 that passes through a pitman 20 which is articulated to a crank pin 21 eccentrically bridging two cheeks of a drum 16' rotatably mounted, with the aid of two stub shafts centered on an axis 17, in an extension 24' of a housing 18' similar to the housing 18 of FIG. 1. One of these stub shafts is rigid with a handle 19' enabling the drum to be manually rotated through an angle close to 180° for shifting the harnesses 12 with the magnets 5 between the working position of FIGS. 2-4 and the inoperative position of FIGS. 5, 6. The fixed magnets 4 are held between teeth 11 of respective racks 10, best seen in FIG. 8, which rest on the ribs 7' of the odd-numbered channels and are immobilized thereon by soldering, for example. The spacing of teeth 11 of racks 10 corresponds to that of the teeth 26 of racks or harnesses 12.

Figure 5:
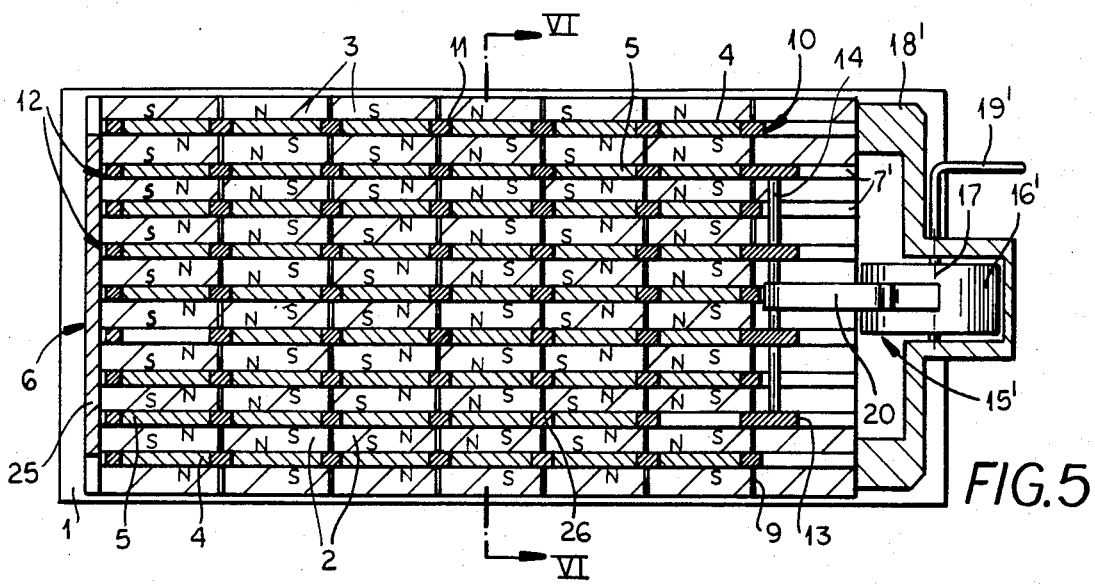
FIG. 5 is a sectional plan view corresponding to that of FIG. 2 but illustrating an inoperative position.
Figure 6:
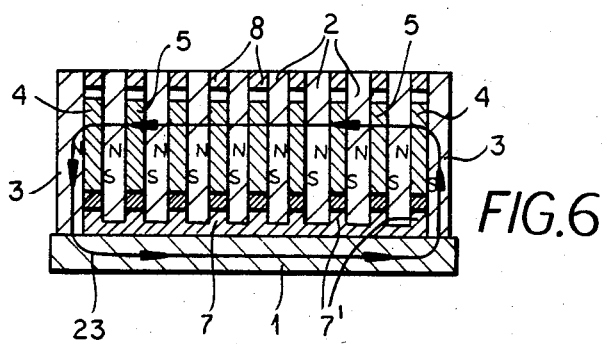
FIG. 6 is a cross-sectional view similar to that of FIG. 4, taken on the line VI—VI of FIG. 5.

The magnets 4 and 5 are flat plates of approximately square outline, somewhat narrower and thinner than pole pieces 2, 3, and are magnetized perpendicularly to their major faces, i.e. in the direction of the columns of the matrix formed by these pole pieces. From the polarity indications N (north) and S (south) appearing in FIG. 2-6 will be noted that the polarities of magnets 4 and 5 alternate within each group of such magnets received in a respective channel and that the sense of polarization is the same for all fixed magnets 4 of a given column. Magnets 5 lodged in aligned compartments of all the harnesses 12 also have the same sense of polarization which in the inoperative position of FIG. 5 corresponds to that of the fixed magnets 4 aligned therewith in a particular column. As a result of this codirectional alignment, and on account of the direct contact between the outermost pole pieces of any column with base plate 1, the lines of force of the magnets in each column form a closed loop 23 through the adjoining pole pieces and the plate 1 in this position, as illustrated in FIG. 6. This magnetic short circuit results in the release of any ferromagnetic workpiece that may have been placed on the upper surface of the array 2-5 or may have adhered to one of the lateral surfaces bounded by pole pieces 3.

Figure 2:
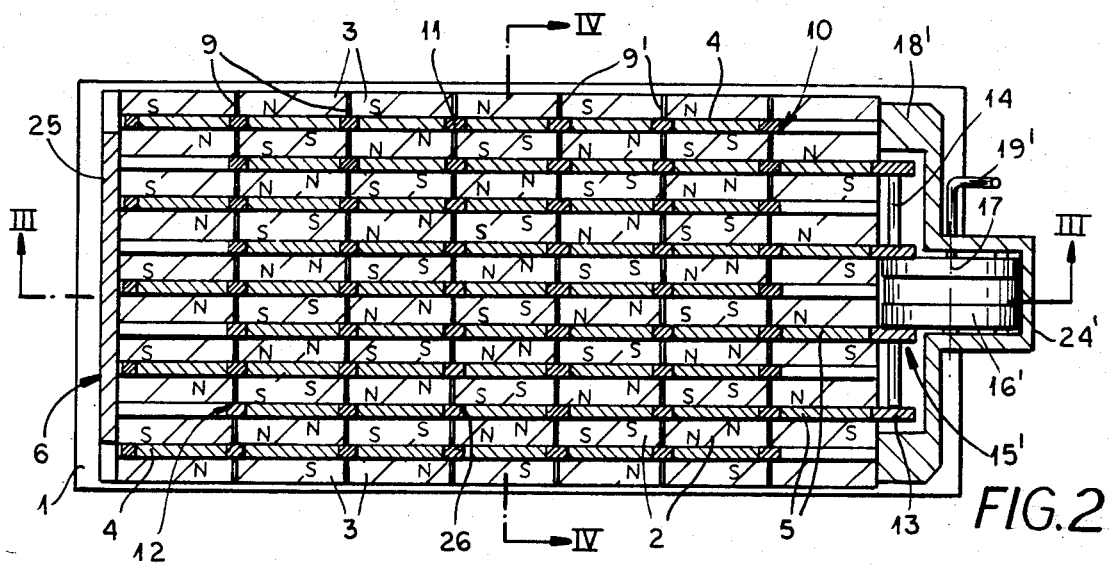
FIG. 2 is a sectional plan view of a chuck similar to that of FIG. 1, taken on the line II—II of FIG. 3 and showing a working position.
Figure 4:
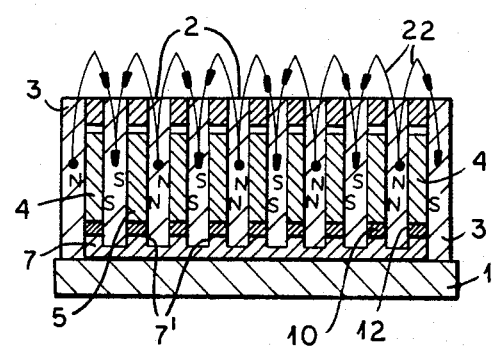
FIG. 4 a cross-sectional view taken on the line IV—IV of FIG. 2.

When the harnesses 12 with magnets 5 are shifted into their working position shown in FIGS. 2-4, the pole faces of magnets 5 (except for those nearest the drive mechanism 15') are in contact with major faces of pole pieces 2 whose opposite faces adjoin pole faces of magnets 4 having the same polarity. Each pole piece 2, therefore, effectively becomes either a north pole or a south pole with polarities alternating within each row and within each column. Since these pole pieces are magnetically insulated from base plate 1 by the underlying grid bottom 7, their lines of force close above the bars 8 to form longitudinal and transverse flux paths 22 as shown in FIGS. 3 and 4 whereby any permeable workpiece on the upper matrix surface is strongly attracted. At the lateral faces the attraction is somewhat weaker since the alternately polarized pole pieces 3 are bridged by the base plate 1 through which part of the flux will pass.

Figure 9:
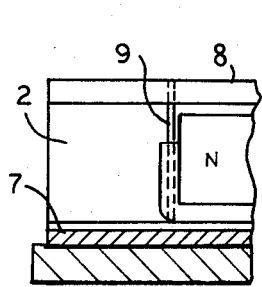
FIG. 9 is a fragmentary longitudinal sectional view illustrating another modification.

If the rear wall 25 is lowered, e.g. to the height of the ribs 7', or is completely omitted, as shown in FIG. 9, the exposed vertical edges of pole pieces 2 also have alternating polarities in the working position and are therefore able to hold a workpiece in position at the left-hand end of the matrix.

Figure 7:
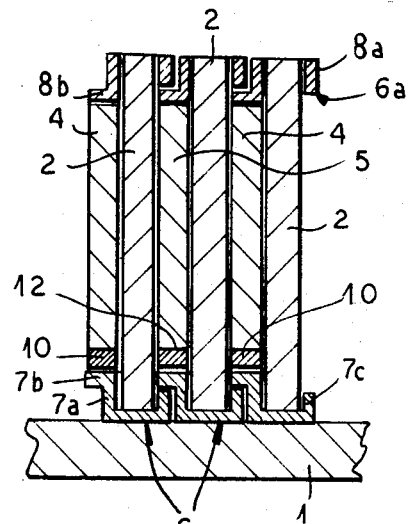
FIG. 7 is a fragmentary cross-sectional view, drawn to a larger scale than FIGS. 4 and 6, showing certain structural modifications.
Figure 8:
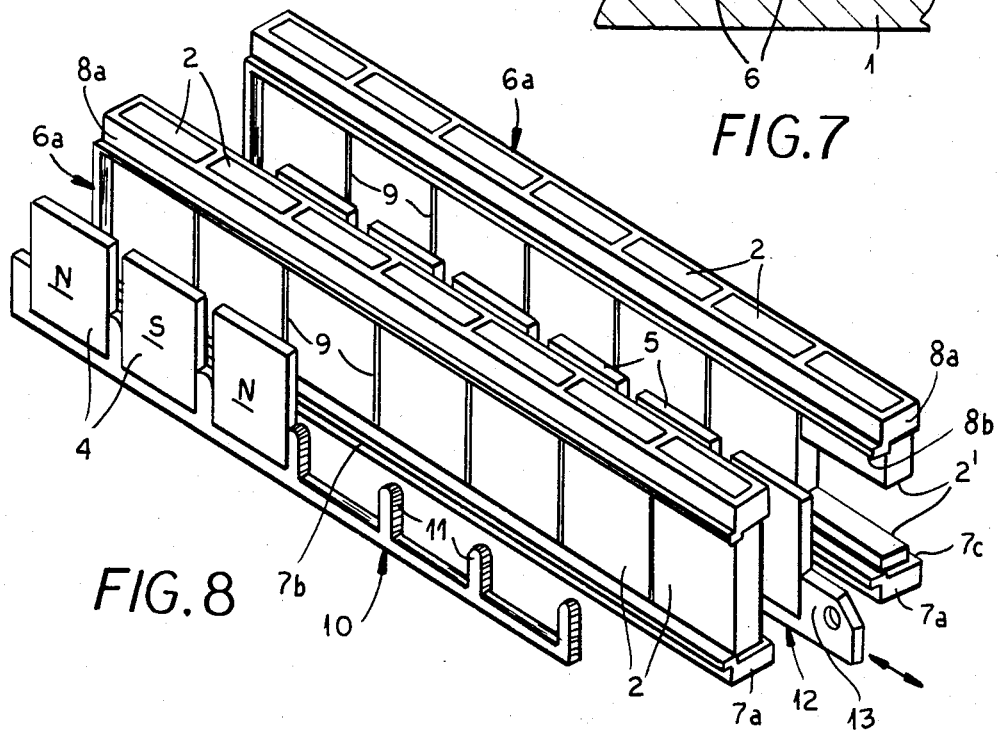
FIG. 8 is an exploded perspective view showing various parts of a chuck incorporating the modifications of FIG. 7.

In FIGS. 7 and 8 I have shown a modified grid 6a with a bottom layer split into longitudinal sections 7a having ledges 7b and ribs 7c which bracket the lower ends of pole pieces 2 and are imbricated to form a continuous floor of nonmagnetic material. The ledges 7b support the racks 10 and the harnesses 12, which are the same as in the preceding Figures. Upper bars 8a, whose profiles are invertedly similar to those of sections 7a, are also mutually imbricated with ledges 8b underlying the edges of adjacent bars; these ledges have rear vertical extensions bounding the channels which accommodate the racks and the harnesses. The bars 8a have longitudinal cutouts separated by transverse webs which are the upper ends of respective stays 9; the tops of the pole pieces 2 project through these cutouts so as to be again level with the upper bar surfaces. The several grid portions 7a and 8a, which are not necessarily metallic, may be adhesively bonded to one another to form a unitary structure. FIG. 8 also shows that some of the pole pieces 2' of the column closest to driving mechanism 15' (of FIGS. 2 and 5) may be partly broken away to provide clearances for the rod 14.

Despite the close contact between the coplanar pole faces of the magnets and the adjoining faces of the pole pieces, the changeover from one position to the other does not require much effort, especially in shifting from the working position to the magnetically more stable inoperative position so as to enable a quick release of an engaged workpiece. With the pitman 20 substantially at dead center in the working position, however, an untimely release will be prevented even in the absence of any detent for the actuating handle 19 or 19'.

The assembly of permanent magnets and pole pieces into a prismatic matrix as shown and described can be carried out automatically or semiautomatically and may involve the juxtaposition of several prefabricated subassemblies to form chucks of various dimensions.

The orthogonal array according to my present invention provides a considerably increased number of pole pieces—and thus of external flux paths 22—in comparison to the device of my prior U.S. Pat. No. 4,379,277 on a holding surface of given dimension so that even small workpieces, overlying only a few of these pole pieces, can be securely retained.

I claim:

1. A magnetic chuck comprising:

a magnetically permeable base plate;
   an orthogonal matrix of flat magnetically permeable and substantially identical pole pieces with mutually parallel major faces arrayed above said base plate in rows parallel to said major faces and in columns transverse thereto, the pole pieces of the two outermost rows of said matrix being in contact with said base plate, the remaining pole pieces included in intermediate rows being separated from said base plate by magnetically nonpermeable spacing means, neighboring rows being separated from one another by channels bounded by coplanar faces of said pole pieces, the latter having upper edges in a plane parallel to said base plate;
   a plurality of groups of flat permanent first magnets fixedly spaced apart in every other of said channels with transverse magnetization and with pole faces confronting the major faces of respective pole pieces of each adjoining row, the polarities of said first magnets alternating within each group but being the same within each column of said matrix;
   a plurality of groups of flat permanent second magnets spaced apart with the same magnetic pitch as said first magnets, respective groups of said second magnets being movably disposed in the remaining channels with transverse magnetization and with pole faces confronting the major faces of respective pole pieces of each adjoining row, the polarities of said second magnets alternating within each group and equaling those of said first magnets aligned therewith in corresponding columns in one position of said second magnets while being opposite the polarities of said first magnets aligned therewith in corresponding columns in another position of said second magnets; and
   actuating means coupled with said second magnets for joint displacement into either of said positions.

2. A magnetic chuck as defined in claim 1 wherein said actuating means comprises a plurality of harnesses of nonmagnetic material respectively slidable in said remaining channels, each of said harnesses forming compartments occupied by respective second magnets of the corresponding group, and a drive member coupled with all said harnesses.

3. A magnetic chuck as defined in claim 2 wherein said harnesses have upstanding teeth defining said compartments and separating the associated magnets from one another.

4. A magnetic chuck as defined in claim 3 wherein each group of first magnets is supported on said base by a respective rack of nonmagnetic material having upstanding teeth of the same spacing as those of said harnesses.

5. A magnetic chuck as defined in claim 2 wherein said drive member comprises a crank rotatable about an axis parallel to said columns and a pitman linking said crank with said harnesses.

6. A magnetic chuck as defined in claim 2 wherein said drive member is mounted on said base adjacent a transverse face of said matrix, said pole pieces being accessible along an opposite transverse face of said matrix.

7. A magnetic chuck as defined in claim 1 wherein said spacing means is part of a nonmagnetic grid overlying said base plate and holding said remaining pole pieces in position.

8. A magnetic chuck as defined in claim 7 wherein said grid comprises a bottom plate provided with a plurality of sets of upstanding stays separating the pole pieces of respective intermediate rows from one another, the upper ends of the stays of each set being interconnected by a bar having cutouts penetrated by the tops of the pole pieces of the respective intermediate row.

9. A magnetic chuck as defined in claim 8 wherein said bottom plate is subdivided into sections bearing respective sets of stays and adjoining one another in imbricated relationship.

10. A magnetic chuck as defined in claim 9 wherein the bars of adjoining rows are mutually imbricated.

11. A magnetic chuck as defined in claim 10 wherein said bars and said sections are adhesively interconnected.

12. A magnetic chuck as defined in claim 8 wherein said grid further comprises an end wall rising from said bottom plate and adjoining a column of said pole pieces, the bars of said rows being rigid with said end plate.

13. A magnetic chuck as defined in claim 12 wherein said actuating means comprises a drive member mounted on said base plate on a side of said matrix opposite said end plate.

14. A magnetic chuck as defined in claim 1 wherein all said magnets are flat with coplanar pole faces in each group.

* * * * *